United States Patent [19]
Jung et al.

[11] Patent Number: 6,053,213
[45] Date of Patent: Apr. 25, 2000

[54] FLEXIBLE PIPE FOR GREAT DEPTHS

[75] Inventors: Patrice Jung, La Mailleraye sur Seine; René Antoine Maloberti, Champigny sur Marne; Anh Tuan Do, Cormeilles en Parisis, all of France

[73] Assignee: Coflexip, France

[21] Appl. No.: 09/216,120

[22] Filed: Dec. 18, 1998

[30] Foreign Application Priority Data

Feb. 18, 1998 [FR] France ................................. 98 01968

[51] Int. Cl.$^7$ ....................................................... F16L 11/16
[52] U.S. Cl. ........................ 138/130; 138/121; 138/131; 138/134; 138/138; 138/139
[58] Field of Search ..................................... 138/130, 129, 138/131, 121, 122, 134, 138, 139

[56] References Cited

U.S. PATENT DOCUMENTS

| | | | |
|---|---|---|---|
| 3,831,636 | 8/1974 | Bittner ..................... | 138/122 |
| 4,344,462 | 8/1982 | Aubert et al. ............. | 138/129 |
| 4,403,631 | 9/1983 | Abdullaev et al. ........ | 138/132 |
| 4,427,033 | 1/1984 | Ege ......................... | 138/153 |
| 4,867,205 | 9/1989 | Bournazel et al. ........ | 138/130 |
| 5,176,179 | 1/1993 | Bournazel et al. ........ | 138/130 |
| 5,269,349 | 12/1993 | Sugier et al. ............. | 138/129 |
| 5,307,842 | 5/1994 | Legueux ................... | 138/137 |
| 5,645,109 | 7/1997 | Herrero et al. ........... | 138/130 |
| 5,813,439 | 9/1998 | Herrero et al. ........... | 138/130 |
| 5,934,335 | 8/1999 | Hardy ....................... | 138/129 |

FOREIGN PATENT DOCUMENTS

| | | |
|---|---|---|
| 1477478 | 7/1967 | France . |
| 2458022 | 12/1980 | France . |
| 2557254 | 12/1983 | France . |
| 2619193 | 8/1987 | France . |
| 2756605 | 12/1996 | France . |
| 1511630 | 5/1978 | United Kingdom . |
| 1486445 | 9/1997 | United Kingdom . |
| 9617198 | 6/1998 | WIPO . |

*Primary Examiner*—James Hook
*Attorney, Agent, or Firm*—Ostrolenk, Faber, Gerb & Soffen, LLP

[57] ABSTRACT

It is of the type comprising a corrugated and sealed internal metal tube (1), a pressure vault (2) wound at a short pitch and having an internal surface which faces the corrugations of the corrugated internal tube, an intermediate sheath, at least two groups of inner and outer armoring layers (3, 5), the armoring layers being wound at a lay angle of less than 55°, and an outer-sheath (6), and it is characterized in that the intermediate sheath (4) is sealed and is arranged between the two groups of armoring layers (3, 5), the said inner group of armoring layers (3) bearing directly on the pressure vault (2).

16 Claims, 3 Drawing Sheets

FIG_1

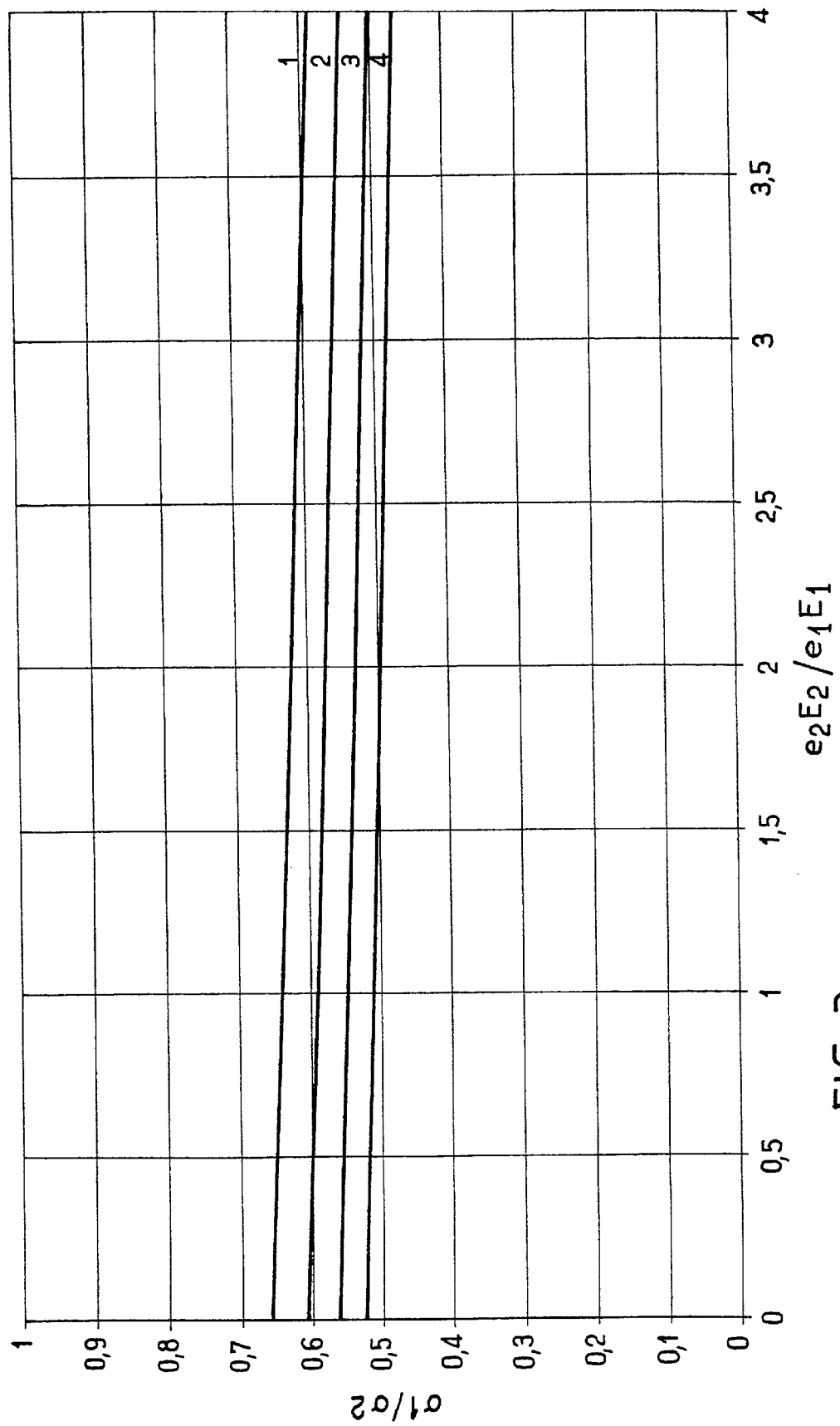
FIG_3

FLEXIBLE PIPE FOR GREAT DEPTHS

BACKGROUND OF THE INVENTION

The present invention relates to a hybrid structure for a flexible pipe for great depths, reinforced with armouring layers and designed for the transportation of effluent under pressure. The structure according to the present invention is particularly well suited to flexible pipes of the flow line type, that is to say flexible pipes paid out from a ship to be laid generally on the seabed and connected to the underwater installations and which work essentially in a static situation.

The flexible pipes used at sea are subjected to various types of external stressing.

The flexible pipes designed to be used in fairly shallow or moderately shallow water (typically between 100 and 800 m) have structures which can vary widely, depending on the conditions of use.

The flexible pipes most widely used in oil production are generally of the unbonded type, in which the various successive and distinct layers have a certain freedom to move with respect to each other, and they comprise, from the inside outwards, a carcass consisting, for example, of a clipped fabric tape which serves to prevent the pipe from being crushed under the external pressure, an internal sheath made of polymer, a pressure vault consisting of at least one shaped interlocked wire wound in a short-pitch helix, so-called tension armours whose lay angle, measured along the longitudinal axis of the pipe, is less than 55° and finally an outer-sheath made of polymer. Such a flexible pipe is denoted as being a "rough-bore" flexible pipe.

When a flexible pipe comprises, from the inside outwards, an internal sheath, a pressure vault consisting of shaped interlocked wires wound with a short pitch and intended to withstand the hoop stresses caused by the flow of effluent through the flexible pipe, an anti-collapse sheath, one or more tensile armours wound around the anti-collapse sheath and an outer-sheath made of polymer, it is known as a smooth-bore.

The elements which make up these various structures are defined in documents API 17B and 17J compiled by the American Petroleum Institute under the title "Recommended Practice for Flexible Pipe".

In an alternative form, the flexible pipe has no pressure vault and the armour layers are spiral-wound with reverse pitch with lay angles of close to 55°. In this case, the internal and external pressures and the tensile forces are exerted or supported by these armour layers; such a pipe is said to be balanced.

Examples of structures of flexible pipes are described, for example, in FR-A-2,619,193 and FR-A-2,557,254.

Proposed in FR-A-2,619,193 is a flexible pipe whose dimensional variations, particularly in the axial direction, can be controlled in such a way that dimensional stability or controlled shortening can be achieved when the internal pressure is raised.

In FR-A-2,557,254, the flexible pipe is designed not to exhibit an appreciable variation in length when subjected to an internal pressure with a "direct end cap effect" which is induced by the pressure within the flexible pipe.

In the flexible pipes currently available, the armouring layers are designed to withstand all the stresses they experience during manufacture, transportation, laying, service and recovery. In particular, they need to withstand the tensile stresses during the laying of the flexible pipe, which stresses are induced by the total weight of the flexible pipe, and the pressure stresses so as to be able to withstand internal and external pressures. The hoop stresses are generally absorbed by a pressure vault when there is one in the flexible pipe. This being the case, designers are looking for a structural compromise without concerning themselves as to whether each of the constituent elements of the structure plays a part in one or more functions, as is the case, for example, of armouring layers at 55° which react the tensile forces just as well as the internal and external pressures experienced by the said flexible pipes.

The external stresses, also known as loading scenarios by the specialists, may be classified into two main categories.

The first category relates to the laying of the flexible pipe from the surface onto the seabed. In this scenario, the weight of the said submerged pipe develops a tensile stress.

The second category relates to the conditions of use of the said pipe that is to say of the pipe laid on the seabed after it has been connected to the seabed equipment. In this case, the stresses experienced by the flexible pipe are essentially due to the differences in pressure between the internal pressure $P_{int}$ inside the flexible pipe and the external pressure $P_{ext}$ exerted on the said flexible pipe and equal to the pressure of the column of water that lies above the said flexible pipe.

When the difference $\Delta P=(P_{int}-P_{ext})$ is positive, the stresses induced in the flexible pipe are radial and longitudinal, the two stresses being considered as positive because they are directed towards the outside of the pipe. The radial stress translates into a radial expansion, while the longitudinal stress translates into a lengthening of the flexible pipe.

When the difference $\Delta P=(P_{int}-P_{ext})$ is negative which essentially corresponds to an empty pipe on the seabed, the stresses are considered as being negative because they are directed towards the inside of the pipe. The radial stress translates into a compression and the longitudinal stress translates into a shortening of the said flexible pipe.

The longitudinal stresses in both instances where the difference $\Delta P$ is positive or negative are tensile stresses.

The end cap effect T induced in a flexible pipe depends, among other things, on the pressure difference $\Delta P=(P_{int}-P_{ext})$ and on the internal and external radii of the said pipe.

When T is positive, the end cap effect is said to be a direct end cap effect.

When T is negative, the end cap effect is said to be a reverse end cap effect.

Down to a certain depth, the reverse end cap effect has little damaging effect on the pipe. By contrast, for greater depths of water, greater than 1200 m for example, the reverse end cap effect may have serious consequences which may go as far as to damage the flexible pipe. This is because when T is highly negative, the axial compressive stresses in the armouring layers become high and the diameter of the helical winding then tends to increase more than might be wished. However, since the armouring layers are restrained by the outer-sheath and possibly by a banding around the said armouring layers, the radial expansion is restricted between acceptable values. However, above and beyond a certain stress value, there may be local plastic deformation of armour layer wires, the consequence of which is irreversible damage to the flexible pipe.

When the outer sheath bursts for whatever reason, the pressure in the annulus increases and becomes equal to the external pressure exerted on the flexible pipe. At a depth of 1800 m, the external pressure is equal to about 180 bar. The armouring layers which experience this external pressure tend to twist. If now, the internal pressure, which was, for example, 300 bar, drops to 1 bar, the armouring layers being expanded on account of the compression due to the 180-bar external pressure, they may deform into a "birdcage".

In application FR-A-2,756,605, there is described a flexible pipe which overcomes the drawbacks of the flexible pipes described in FR-A-2,458,022, WO-96/17198 or GB-A-1,486,445 and which comprises, from the inside outwards, a corrugated metal internal tube, a pressure vault, a polymer anti-collapse sheath, two armour layers wound with a lay angle of less than 55° with respect to the longitudinal axis of the pipe, a reinforcing fabric tape and finally an outer-sheath. The internal tube or liner has corrugations which are spaced apart along the entire length and which face the interior surface of the pressure vault.

The flexible pipe described in this published application constitutes a satisfactory solution as far as $H_2S$ corrosion is concerned, because the liner constitutes an effective barrier against the diffusion of gases for two-phase effluents of the crude oil (or "life crude") type. However, it does not solve the issue of the reverse end cap effect, because neither the anti-collapse sheath nor the reinforcing sheath can substantially reduce the consequences of a reverse end cap effect for great depths.

SUMMARY OF THE INVENTION

The object of the present invention is to propose a new structure for a flexible pipe which will effectively allow the reverse end cap effect to be countered.

The subject of the present invention is a flexible pipe of the type comprising, from the inside outwards, a corrugated and gastight internal metal tube, a pressure vault which has an internal surface facing the corrugations of the said corrugated internal tube, at least two groups of inner and outer armouring layers, the lay angle of which is less than 55°, and an outer-sheath, characterised in that an intermediate sheath is arranged between the two groups of armouring layers, the said inner group of armouring layers bearing directly on the pressure vault.

One advantage of the present invention lies in the fact that the flexible pipe is well able to withstand the reverse end cap effect and that this is true even though, on the one hand, the anti-collapse sheath and, on the other hand, the reinforcing fabric tape usually arranged between the outer-sheath and the outer group of armouring layers have been omitted.

This is because when, following some accident, the outer-sheath is damaged, the external pressure exerted on the said flexible pipe, and which may be as much as 180 bar for a depth of about 1800 m, is transmitted to the outer group of armouring layers, which pressure is transmitted to the intermediate sheath. However, since the latter constitutes a sealing barrier for the inner group of armouring layers, the water which has entered the outer group of armouring layers is not diffused into the inner group of armouring layers, and this prevents the armour layers that constitute the said inner group from radial expansion and undergoing "birdcage" deformation, and this is because the intermediate sheath becomes pressed against the inner group of armouring layers under the effect of the water pressure; in consequence, the risk of the outer group of armouring layers undergoing radial expansion and "birdcage" deformation is eliminated.

According to other features of the present invention, the inner group of armouring layers is wound with a lay angle of greater than 35°, while the outer group of armouring layers is wound with a lay angle of less than 30°, the difference between the lay angles being greater than 5°, and preferably being between 10 and 15°.

Another advantage of the present invention lies in the fact that the function of withstanding the tension developed when laying the flexible pipe on the seabed can be better separated from the function of withstanding the external and internal pressures developed when the flexible pipe is in service. Of course, tensile stresses are not taken up totally by the outer group of armouring layers with the low lay angle because it is obvious, for structural and physical reasons, that the other group of armouring layers also plays a part in withstanding the said tensile stresses. Likewise, a very small proportion of the stresses that are due to the external and internal pressures on the flexible pipe is transmitted to the outer group of armouring layers.

When designing the armouring layers, it is also necessary to take into account the manufacturing tolerances and the nature of the materials used to produce the flexible pipes.

Other advantages and features will emerge more clearly from reading about a preferred embodiment of the invention, and from the appended drawings, in which:

THE BRIEF DESCRIPTION OF THE DRAWINGS

FIG. 3 depicts curves of $\sigma_1/\sigma_2$ as a function of $e_2E_2/e_vE_v$ for constant values $\alpha_1$ and $\alpha_2$ with variable $e_1E_1/e_vE_v$.

Figure 1:
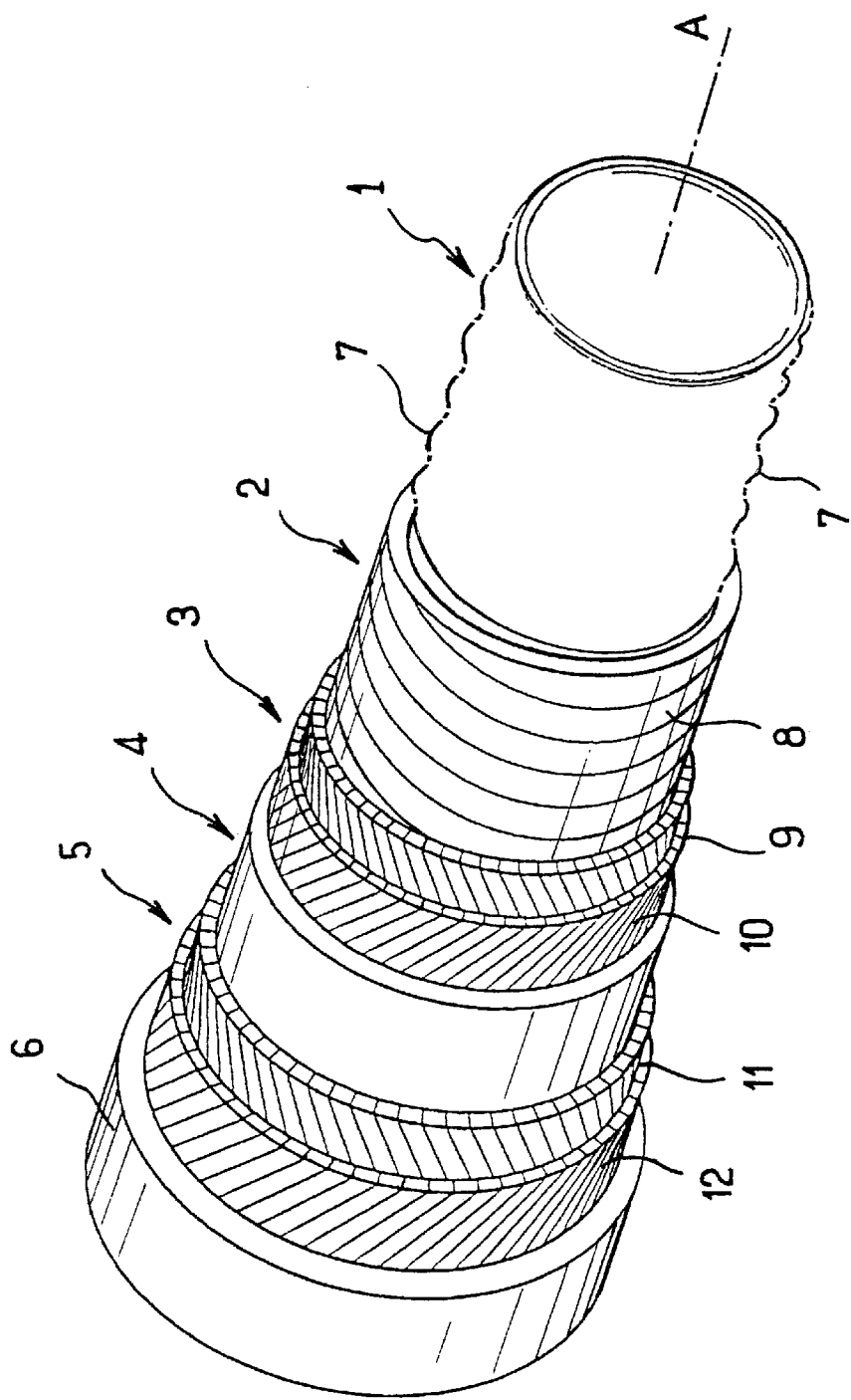
FIG. 1 is a perspective cut-away partial view of a flexible pipe according to the invention.

The flexible pipe according to the invention, as depicted in FIG. 1, comprises, from the inside outwards, an internal metal corrugated tube 1, known as a liner, a pressure vault 2, a first, inner, group of armouring layers 3, an intermediate sheath 4, a second, outer, group of armouring layers 5 and an outer-sheath 6, for example made of polymer.

The metallic corrugated tube 1 or liner has corrugations 7 uniformly spaced along the entire length, the repeat of the crests of the corrugations or of the troughs being defined, for convenience, by a period L, even though it could also be denoted by the pitch term used for the windings of the inner and outer groups of armouring layers 3 and 5.

The pressure vault 2 consists, for example, of a helical winding of short pitch of a shaped interlocked wire 8 around the liner 1, the helix angle formed by the winding being close to 90° with respect to the longitudinal axis A of the said pipe. The winding of the pressure vault may constitute what is commonly known as a group of armouring layers even if it is a single layer of winding. The shaped interlocked wire 8 comprises, on its internal surface, concave and convex rounded parts so that they face the convex and concave parts of the corrugations of the metallic liner 1, as explained in detail in application FR-96/14892 which is incorporated into this description.

According to a first feature of the present invention, the flexible pipe comprises no anti-collapse sheath between the inner group of armouring layers 3 and the pressure vault 2, the said inner group of armouring layers 3 resting directly on the said pressure vault 2. In addition, the outer-sheath 6 rests directly on the outer group of armouring layers 5 without the insertion of a reinforcing fabric tape wound on the said outer group of armouring layers 5. The fact that the anti-collapse sheath and the reinforcing fabric tape have been omitted and an intermediate sheath 4, for example made of polymer, has been inserted between the two groups of armouring layers 3 and 5 has, unexpectedly and surprisingly, revealed that the flexible pipe according to the invention can effectively counter the reverse end cap effect; thus, despite the tearing of the outer-sheath 6 and the application of a negative pressure difference $\Delta P=(p_{int}-p_{ext})$ whose absolute value was 100 bar, the inner group of armouring layers 3 did not undergo "birdcage" deformation and the radial expansion of the said group of armouring layers 3 remained within acceptable limits, thus preventing the outer group of armouring layers 5 from expanding radiate.

It should be noted that the intermediate sheath 4 also acts as an anti-collapse sheath, effectively preventing the flexible pipe from flattening.

According to the present invention, the first group of armouring layers 3 preferably consists of at least two armour layers 9 and 10, wound in opposite directions in a short-pitch helical winding, the lay angle of which, defined with respect to the longitudinal axis A of the pipe, is greater than 35° and is preferably between 35° and 45°. These armour layers 9 and 10 are intended mainly to withstand the pressures outside and inside the flexible pipe, even though they play a part in withstanding the other stresses which develop within the flexible pipe, such as during laying on the seabed, for example. Of course, the said armour layers 9 and 10 will be designed and produced from appropriate materials to ensure that they work correctly depending on the effluent that is to flow through the said flexible pipe and depending on the depth of water in which the said flexible pipe is laid.

The flexible pipe according to the present invention comprises two annuli, an inner annulus and an outer annulus.

An annulus is the space between two concentric tubular sheaths.

The inner annulus is delimited by the sealed metal liner 1 and the intermediate sheath 4, and comprises the pressure vault 2 and the inner group of armouring layers 3 which consists of the two armour layers 9, 10.

The outer annulus is delimited by the intermediate sheath 4 and the outer-sheath 6, and comprises the outer group of armouring layers 5 consisting of the two armour layers 11, 12.

As long as the flexible pipe is full of a fluid such as the effluent flowing inside it, the radial stresses are reacted by the pressure vault 2; the tensile stresses that are due to a lengthening or shortening of the said pipe, are reacted by the pair of inner armour layers 9 and 10. Now, the fact that the said pair of armour layers is wound at a short pitch makes this pair able to withstand the said tensile stresses. With a lay angle of 35° and preferably less than 45° it is possible to be sure that the tensile stresses developed by the combined efforts of the internal and external pressures when the flexible pipe is in service will be borne, almost in their entirety, by inner armour layers 9 and 10.

To ensure that the so-called "laying" tensile stresses, that is to say those which are developed when laying the flexible pipe on the seabed, do not have to be borne in their entirety by the armour layers 9 and 10, the present invention recommends that the second group of armouring layers 5 be produced in such a way that it takes up some part of the tensile "laying" stresses. For this, the outer group of armouring layers consists of at least one helical winding, the lay angle of which is less than 30° and, in this case, the winding is preferably in -the same direction as the armour layer 9. As a preference, the outer group of armouring layers 5 consists of at least one pair of armour layers 11 and 12, the direction of winding of the reinforcing wire of the layer 11 being the same as that of the layer 9, whereas the direction of winding of the reinforcing wire of the layer 12 is preferably the same as that of the layer 10.

The two armour layers 11 and 12 are therefore wound in opposite directions, each having a lay angle of less than 30° and preferably of between 15 and 30°.

In order to determine the proportions of laying tension reacted by each of the two groups of armouring layers—inner 9 and 10, and outer 11 and 12—the criterion to be adopted is the ratio $\sigma_1/\sigma_2$ of the stresses in the inner group of armouring layers 9 and 10 to those there are in the outer group of armouring layers 11, 12.

In general, and simplifying the calculations, it can validly be taken that:

$$\frac{\sigma_1}{\sigma_2} = \frac{E_1 \cdot \cos^2\alpha_1}{E_2 \cdot \cos^2\alpha_2} = \left[\frac{1 + k \cdot \tan^2\alpha_1}{1 + k \cdot \tan^2\alpha_2}\right]$$

In this formula:

$\sigma_1$ is the tensile stress in the armour layers 9 and 10, $\sigma_2$ is the tensile stress in the armour layers 11 and 12, $E_1$ is the elastic modulus of the material of the armour layers 9 and 10 which are assumed to have been made from the same material, $E_2$ is the elastic modulus of the material of the armour layers 11 and 12 which are assumed to have been made from the same material, $\alpha_1$ is the lay angle of the armour layers 9 and 10, $\alpha_2$ is the lay angle of the armour layers 11 and 12, k is a number which depends on the lay angles and stiffnesses $e_iE_i$ of the pressure vault and of the inner and outer groups of armouring layers, $e_i$ being the equivalent thickness of the layer i in question.

Figure 2:
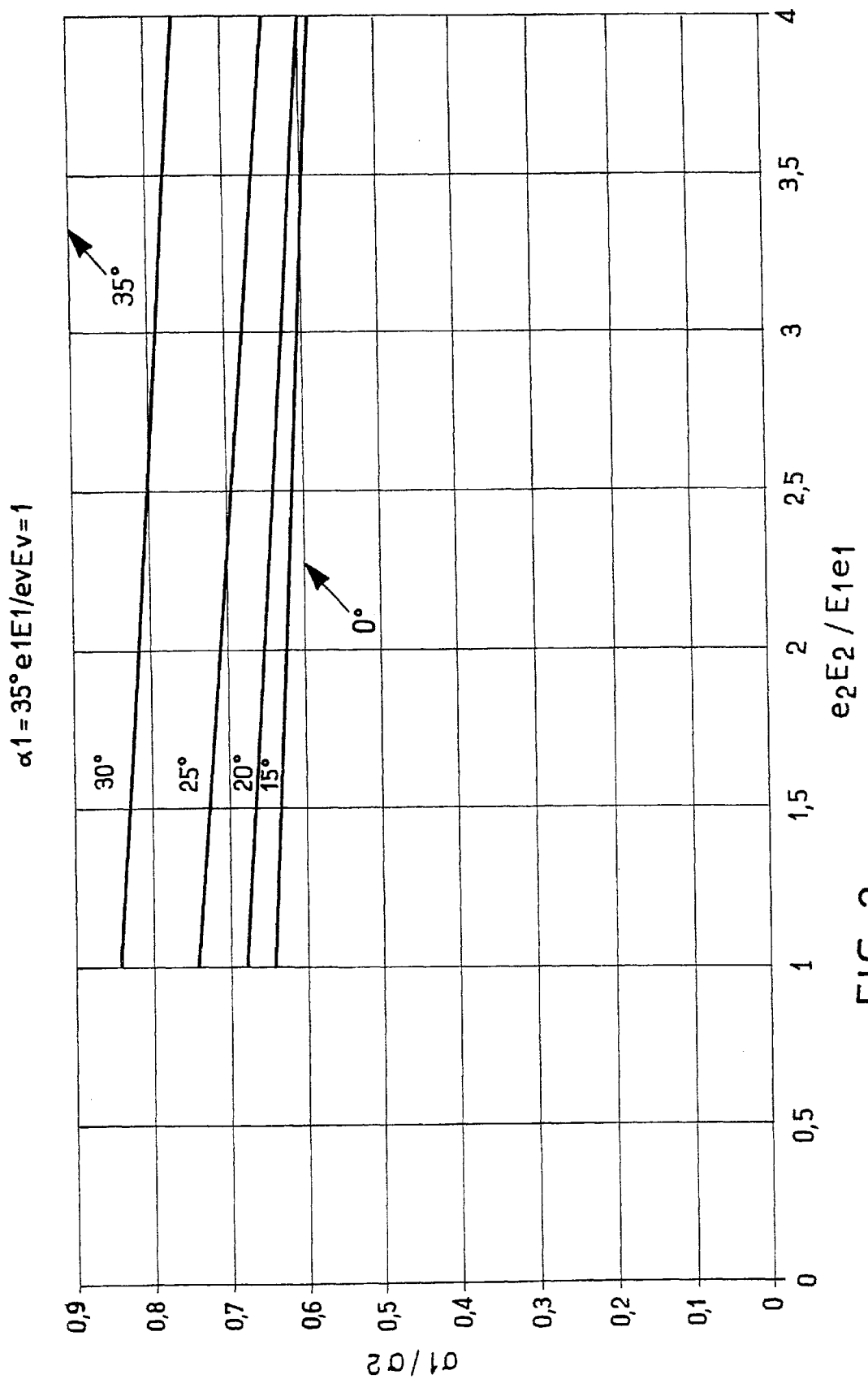
FIG. 2 depicts curves of $\sigma_1/\sigma_2$ as a function of $e_2E_2/e_1E_1$ for various lay angles $\alpha_2$.

FIGS. 2 and 3 depict curves of the ratio $\sigma_1/\sigma_2$ as a function of the ratio of stiffnesses $e_2E_2/e_1E_1$ and $e_2E_2/e_vE_v$.

The curves of FIG. 2 have been calculated assuming that the lay angle $\alpha_1$ of the armour layers 9 and 10 is equal to 35° and that the ratio of the stiffness $e_1E_1$ of the armour layers 9 and 10 to the stiffness $e_vE_v$ of the pressure vault 2 is equal to 1, and this is for various lay angles $\alpha_2$ of the armour layers 11 and 12.

It can be seen, that the greater the lay angle $\alpha_2$, the lesser the extent to which the armour layers 11 and 12 react the laying tension. A good compromise is achieved when the ratio of the stiffnesses $e_2E_2/e_1E_1$ is equal to 2 with a lay angle $\alpha_1=20°$. In this case, the armour layers 11 and 12 react about 35% of the laying tension, the remainder (about 65%) being reacted by the armour layers 9 and 10.

When $\alpha_1$ and $\alpha_2$ are respectively set as equal to 15° and 35° and the ratio of the stiffnesses $e_1E_1/e_vE_v$ is varied between 1 and 4, it can be seen that, for a ratio $e_2E_2/e_vE_v$ equal to 2 and a ratio $e_1E_1/e_vE_v$ equal to 4, it is possible to have 50% of the laying tension reacted by the armour layers 11 and 12 (FIG. 3).

Thus, to obtain the lowest possible laying stress in the armour layers 9 and 10, the following factors can be combined:

choosing a low lay angle $\alpha_2$ for the armour layers 11 and 12, for example an angle equal to 15°.

choosing high stiffness ratios for $$\frac{E1e1}{Evev} \text{ and } \frac{E2e2}{Evev}$$

To achieve that, it is possible either to increase the equivalent thicknesses $e_1$, $e_2$ of the armouring layers compared with the equivalent thickness $e_v$ of the pressure vault 2, or to take material of a high elastic modulus $E_i$ for the armouring layers. However, if just one of the two moduli is chosen to be higher than that of the pressure vault, it is preferable to select the modulus $E_2$ because the ratio $E_1/E_2$, that participates in the formula of $\sigma_1/\sigma_2$ will cause a greater drop in the stress ratio $\sigma_1/\sigma_2$.

The present invention recommends the use of carbon as the material for the armour layers 11 and 12, or alternatively an aramid or a polyaramid.

An armour made, for example, of carbon, and in which the elastic modulus E of the said armour is 250,000 MPa, with an equivalent thickness e of 1.5 mm, yields a stiffness $eE=1.5\times250,000=375,000$, whereas the stiffness $e_vE_v$ of a pressure vault made, for example, of aluminium by winding at 83.5° a shaped interlocked wire of elastic modulus $E_v=50,000$ MPa and equivalent thickness $e_v=5$ mm is equal to $5\times50,000=250,000$. The equivalent thickness is defined by the ratio S/p in which S is the cross section of the wire and p the winding pitch.

This being the case, the stiffest and most lightweight possible material will be chosen for the armour layers 11 and 12, so as to lighten the flexible pipe while at the same time giving it the mechanical properties it needs for the various types of use.

As the flexible pipe according to the invention is of the unbonded type, there is clearance between the various constituent elements. These clearances may change the stresses in the flexible pipe. Specifically, the clearance there is, on the one hand, between the first armour layer 9 and the pressure vault 2 and, on the other hand, between the armour layers 9 and 10, tend to reduce the ratio of the stresses $\sigma_1/\sigma_2$, whereas the clearance there is between the armour layer 11 and the intermediate sheath 4 on the one hand, and between the armour layers 11 and 12 on the other hand, tend to increase the ratio $\sigma_1/\sigma_2$. Thus, it is recommended that the clearance between the armour layers 11 and 12 and between the armour layer 11 and the intermediate sheath 4 should be decreased as much as possible.

We claim:

1. A flexible, pressure resisting pipe for transmitting fluid, comprising:
    an internal, sealed, corrugated metal tube;
    a pressure vault wound around the internal tube at a short pitch, the pressure vault having an internal surface which faces the corrugations of the internal tube;
    a radially inner group of armoring layers around and bearing directly on the pressure vault;
    a radially outer group of armoring layers radially outward of the inner group of armoring layers;
    the armoring layers of the inner and the outer groups are wound at a lay angle of less than 55°;
    an intermediate sheath between the inner armoring layers and the outer armoring layers;
    an outer sheath around the outer armoring layers.

2. The flexible pipe of claim 1, wherein the outer group of armoring layers is wound with a lay angle of less than 30°.

3. The flexible pipe of claim 1, wherein the outer group of armoring layers is comprised of at least one armor layer having a direction of winding which is the same direction as the direction of winding of the inner group of armor layer that bears on the pressure vault.

4. The flexible pipe of claim 3, wherein the outer group of armoring layer comprises at least two armor layers wound in respective opposite directions, and the lay angle of each of the armor layers of the outer group is less than 30°.

5. The flexible pipe of claim 4, wherein the directions of winding of the layers of the outer group of armoring layers are respectively the same as the directions of winding of the layers of the inner group of armoring layers.

6. The flexible pipe of claim 1, wherein the inner group of armoring layers is wound with a lay angle greater than 35°.

7. The flexible pipe of claim 6, wherein the inner group of armoring layer comprises at least two armor layers, one radially outward and the other radially inward, wherein the at least two armor layers of the inner group are wound in respective opposite directions, and the lay angle of the inner group of armoring layers is greater than 35°.

8. The flexible pipe of claim 7, wherein the outer group of armoring layer comprises at least two armor layers wound in respective opposite directions, and the lay angle of each of the armor layers of the outer group is less than 30°;
    the directions of winding of the layers of the outer group armoring layers are respectively the same as the directions of winding of the layers of the inner group of armoring layers.

9. The flexible pipe of claim 8, wherein the inner group of armoring layer comprises at least two armor layers, one radially outward of the other, wherein the armor layers of the inner group are wound in opposite directions, and the lay angle of each group of armoring layers is greater than 35°.

10. The flexible pipe of claim 9, wherein the materials used for the outer group of armoring layers and for the inner group of armoring layers are selected so that the outer group of armoring layers has a greater stiffness than the inner group of armoring layers.

11. The flexible pipe of claim 1, wherein the directions of windings of the layers of the outer group or armoring layers are respectively the same as the directions of windings of the layers of the inner group of armoring layers.

12. The flexible pipe of claim 1, wherein the outer group of armoring layers are comprised of windings of a wire selected from the group consisting of carbon wire, or aramid wire or polyaramid wire.

13. The flexible pipe of claim 1, wherein the materials used for the outer group of armoring layers and for the inner group of armoring layers are selected so that the outer group of armoring layers has a greater stiffness than the inner group of armoring layers.

14. The flexible pipe of claim 13, wherein the ratio of stiffnesses is greater than 1.

15. The flexible pipe of claim 14, wherein the ratio of stiffnesses is in the range of between 1 and 4.

16. The flexible pipe of claim 1, wherein the material of the intermediate sheath is a polymer material.

* * * * *